(12) United States Patent
Cai et al.

(10) Patent No.: US 8,886,034 B2
(45) Date of Patent: Nov. 11, 2014

(54) SYSTEMS AND METHODS FOR OPTICAL RECEIVER DECISION THRESHOLD OPTIMIZATION

(75) Inventors: Qingzhong Cai, Plano, TX (US); Xiaoguang Sun, Holmdel, NJ (US); Gabriel E. Cardona, Richardson, TX (US)

(73) Assignee: Menara Networks, Inc., Dallas, TX (US)

( * ) Notice: Subject to any disclaimer, the term of this patent is extended or adjusted under 35 U.S.C. 154(b) by 131 days.

(21) Appl. No.: 13/554,737

(22) Filed: Jul. 20, 2012

(65) Prior Publication Data

US 2012/0281992 A1    Nov. 8, 2012

Related U.S. Application Data

(62) Division of application No. 12/111,719, filed on Apr. 29, 2008, now Pat. No. 8,249,447.

(51) Int. Cl.
*H04B 10/00* (2013.01)
*H04B 10/69* (2013.01)

(52) U.S. Cl.
CPC .................................. *H04B 10/695* (2013.01)
USPC ........................................................... 398/24

(58) Field of Classification Search
CPC .................................................... H04B 10/695
USPC ............................................................ 398/24
See application file for complete search history.

(56) References Cited

U.S. PATENT DOCUMENTS

| | | | |
|---|---|---|---|
| 5,896,391 A | 4/1999 | Solheim et al. | |
| 6,439,918 B1 | 8/2002 | Togami et al. | |
| 6,871,304 B2 | 3/2005 | Hadjihassan et al. | |
| 7,218,686 B2 | 5/2007 | Matsumoto et al. | |
| 7,269,347 B1 * | 9/2007 | Matricardi et al. | 398/24 |
| 2004/0070805 A1 | 4/2004 | Eiselt et al. | |
| 2005/0022077 A1 | 1/2005 | Ohlen | |
| 2006/0256892 A1 | 11/2006 | Momtaz | |
| 2007/0071443 A1 | 3/2007 | Fukumitsu et al. | |
| 2008/0089693 A1 * | 4/2008 | El-Ahmadi et al. | 398/135 |

* cited by examiner

*Primary Examiner* — Danny Leung
(74) *Attorney, Agent, or Firm* — Clements Bernard PLLC; Lawrence A. Baratta, Jr.; Christopher L. Bernard

(57) ABSTRACT

The present invention provides systems and methods for a receiver threshold optimization loop to provide self-contained automatic adjustment in a compact module, such as a pluggable optical transceiver. The receiver threshold optimization loop utilizes a performance metric associated with the receiver, such as FEC, to optimize performance of the receiver. The receiver is optimized through a change in the receiver threshold responsive to the performance metric. Advantageously, the present invention provides improved receiver performance through a continuous adjustment that is self-contained within the receiver, such as within a pluggable optical transceiver compliant to a multi-source agreement (MSA). The receiver threshold optimization loop can include a fine and a coarse sweep of adjustment from an initial setting.

12 Claims, 11 Drawing Sheets

SYSTEMS AND METHODS FOR OPTICAL RECEIVER DECISION THRESHOLD OPTIMIZATION

CROSS-REFERENCE TO RELATED APPLICATION(S)

This application is a divisional of U.S. patent application Ser. No. 12/111,719 filed Apr. 29, 2008 and entitled "SYSTEMS AND METHODS FOR OPTICAL RECEIVER DECISION THRESHOLD OPTIMIZATION," the contents of which are incorporated in full by reference herein.

FIELD OF THE INVENTION

The present invention relates generally to optical receivers. More particularly, the present invention provides systems and methods for a receiver threshold optimization loop to provide self-contained automatic adjustment in a compact module, such as a pluggable optical transceiver defined by a Multi-Source Agreement (MSA).

BACKGROUND OF THE INVENTION

Optical receivers are configured to receive optical signals which include modulated information streams, and to provide an electrical signal corresponding to the modulated information streams. The corresponding electrical signal can include threshold voltages which determine the value of the information, e.g. a logical "1" and "0" bit. Note, the information can be modulated in a variety of formats, such as on-off keying, multi-level coding, phase modulation, etc. Referring to FIG. 1, an eye diagram 10 illustrates a conventional mechanism for receiver threshold voltage determination of a receiver. Eye diagrams illustrate a pattern produced in the optical signal (and corresponding electrical signal) is synchronously observed over many bits, i.e. an overlay of all the bits transmitted. The eye diagram 10 is useful to illustrate deleterious effects, such as dispersion, noise, non-linear effects, etc., associated with optical transmission systems.

The eye diagram 10 is a graph of decision level, illustrated in percent, versus time. The decision level can correspond to a voltage level in the electrical signal, and the time corresponds to a unit interval (UI) from 0 to 1. The UI represents a time interval over which the receiver receives one symbol of information. In the exemplary eye diagram 10, there is a high optical power level 12 representing a logical "1" level and a low optical power level 14 representing a logical "0". The eye diagram 10 includes a decision threshold 16 above which represents the "1" level and below which represents the "0" level. In practice, the high optical power level 12 and the low optical power level 14 are impacted due to dispersion, noise, and non-linear effects. For example, dispersion lowers the high optical power level 12 and raises the low optical power level 14, and noise and non-linear effects can expand the levels 12, 14. Accordingly, the receiver may experience errors based on these effects.

Pluggable optical transceivers utilize an optical receiver to receive an optical signal from a corresponding optical transmitter. Pluggable optical transceivers are defined through multi-source agreements (MSAs). MSAs are agreements for specifications of pluggable transceivers agreed to by two or more vendors and promulgated for other vendors and network operators to utilize. MSAs allow other vendors to design transceivers to the same specifications reducing risk for vendors and operators, increasing flexibility, and accelerating the introduction of new technology. Exemplary MSAs include XFP, XPAK, XENPAK, X2, XFP-E, SFP, SFP+, 300-pin, and the like. Additionally, new MSAs are emerging to address new services and advanced technology. Each MSA defines the transceiver's mechanical characteristics, management interfaces, electrical characteristics, optical characteristics, and thermal requirements. Because of MSA specifications, MSA-compliant pluggable transceivers are standardized among equipment vendors and network operators to support multiple sources for pluggable transceivers and interoperability. As such, MSA-compliant pluggable transceivers have become the dominant form of optical transmitters and receivers in the industry.

Advantageously, MSA-compliant pluggable transceivers ensure engineering re-use and compatibility between various applications and the physical media dependent transceivers. Further, equipment vendors realize streamlined manufacturing and inventory control by removing wavelength specific decisions from the manufacturing process. For example, all line cards are manufactured the same, and the pluggable transceiver module with the desired wavelength (e.g. 850 nm, 1310 nm, 1550 nm, coarse wave division multiplexed (CWDM), dense wave division multiplexed (DWDM), etc.) is plugged in as a function of the specific application or development configuration. Network operators and service providers have adopted pluggable transceivers to reduce sparing costs. Further, significant cost reductions are realized by MSA standardization of pluggable transceivers because of multiple independent manufacturing sources.

The MSA specifications tightly define the mechanical characteristics, management interfaces, electrical characteristics, optical characteristics, and thermal requirements of pluggable transceivers. Advantageously, this enables interoperability among equipment vendors of pluggable transceivers, i.e. any MSA-compatible pluggable transceiver can be used in any host system designed to the MSA specification; however, these tightly defined characteristics limit the performance of pluggable transceivers since the MSA specifications were designed to maximize density and minimize cost, and not to provide advanced optical performance. Disadvantageously, conventional pluggable optical transceivers do not provide advanced optical layer operations, administration, maintenance, and provisioning (OAM&P) and forward error correction (FEC). Accordingly, these conventional pluggable optical transceivers do not include receiver threshold optimization algorithms.

Conventional techniques exist in the art to adjust the decision threshold 16 to improve receiver performance. For example, these techniques can adjust the decision level of the decision threshold 16 based upon a plurality of parameters and calculations. However, such techniques are complex and often require external communication from the receiver, such as to receive the plurality of parameters and calculations. It would be useful to implement a receiver optimization threshold loop which can provide self-contained automatic adjustment in a compact module, such as a pluggable optical transceiver. Due to the low-cost, high-density, and widespread deployment of pluggable transceivers, both equipment vendors and network operators recognize a need to extend the benefits of pluggable transceivers to metro, regional and core network applications to enable carrier-grade wavelength division multiplexed (WDM) transport without the need for additional equipment such as optical transponders or additional circuitry performance enhancements. Such a need also must preserve the MSA mechanical characteristics, management interfaces, electrical characteristics, optical characteristics, and thermal requirements to maintain interoperability with existing host systems.

BRIEF SUMMARY OF THE INVENTION

In various exemplary embodiments, the present invention provides systems and methods for a receiver threshold optimization loop to provide self-contained automatic adjustment in a compact module, such as a pluggable optical transceiver. The receiver threshold optimization loop utilizes a performance metric associated with the receiver, such as FEC, to optimize performance of the receiver. The receiver is optimized through a change in the receiver threshold responsive to the performance metric. Advantageously, the present invention provides improved receiver performance through a continuous adjustment that is self-contained within the receiver, such as within a pluggable optical transceiver. The receiver threshold optimization loop can include a fine and a coarse sweep of adjustment from an initial setting.

In an exemplary embodiment of the present invention, a receiver decision threshold optimization method includes operating a receiver at a default setting; if no frame and error correction count is received, performing a coarse sweep adjustment of a receiver decision threshold of the receiver if a valid frame and error correction count is received, performing a fine sweep adjustment of the receiver decision threshold; and operating the receiver at the adjusted receiver decision threshold. The coarse sweep adjustment can include for each of a plurality of sequential steps across an eye opening of the receiver decision threshold, setting the receiver decision threshold at one of the plurality of sequential steps and measuring an error count at the one of the plurality of sequential steps; and selecting a step of the of the plurality of sequential steps which includes a lowest error count. The fine sweep adjustment can include from a current setting of the receiver decision threshold, selecting a positive setting and a negative setting, wherein the positive setting includes a predetermined positive adjustment of the receiver decision threshold from the current setting, and wherein the negative setting a predetermined negative adjustment of the receiver decision threshold from the current setting; setting the receiver decision threshold at each of the positive setting and the negative setting for a predetermined time period; measuring error count at each of the positive setting and the negative setting; and selecting one of the positive setting, the negative setting, and the current setting responsive to a lowest error count. Optionally, the fine sweep adjustment is repeated until a lowest error count is found. Alternatively, during the operating the receiver at the adjusted receiver decision threshold step, the fine sweep adjustment is performed responsive to an error count above a predetermined threshold. During the operating the receiver at the adjusted receiver decision threshold step, the receiver decision threshold can be set to the default setting and the receiver decision threshold optimization method can be performed responsive to one of a loss of signal and a low power condition. The receiver can include circuitry configured to: frame/de-frame an optical signal; encode/decode error correction on the optical signal; and monitor error counts from the error correction on the optical signal. Optionally, the receiver includes a pluggable optical transceiver defined by a multi-source agreement, and a host device compliant to the multi-source agreement can operate the receiver without modification.

In another exemplary embodiment of the present invention, an optical receiver with decision threshold optimization includes an optical detector configured to receive an optical signal and convert the optical signal to an electrical signal; decision circuitry configured to receive the electrical signal and to detect information from the electrical signal responsive to a decision threshold; integrated framing and error correction circuitry configured to deframe the optical signal and decode error correction on the optical signal; wherein the decision threshold includes a default setting, and wherein the decision threshold is adjusted through a coarse adjustment mechanism, a fine adjustment mechanism, and a combination thereof to minimize errors. The coarse adjustment mechanism can be performed if no frame and error correction count is received and the fine adjustment mechanism can be performed if a valid frame and error correction count is received. The coarse adjustment mechanism can include for each of a plurality of sequential steps across an eye opening of the decision threshold, setting the decision threshold at one of the plurality of sequential steps and measuring an error count at the one of the plurality of sequential steps; and selecting a step of the of the plurality of sequential steps which includes a lowest error count. The fine adjustment mechanism can include from a current setting of the receiver threshold, selecting a positive setting and a negative setting, wherein the positive setting includes a predetermined positive adjustment of the decision threshold from the current setting, and wherein the negative setting a predetermined negative adjustment of the decision threshold from the current setting; setting the decision threshold at each of the positive setting and the negative setting for a predetermined time period; measuring error count at each of the positive setting and the negative setting; and selecting one of the positive setting, the negative setting, and the current setting responsive to a lowest error count. Optionally, the fine sweep adjustment is repeated until a lowest error count is found. Alternatively, the fine adjustment mechanism is performed responsive to an error count above a predetermined threshold. Optionally, the optical receiver includes a pluggable optical transceiver defined by a multi-source agreement, and a host device compliant to the multi-source agreement can operate the optical receiver without modification.

In yet another exemplary embodiment of the present invention, a pluggable optical transceiver with receiver decision threshold optimization includes integrated framing and error correction circuitry configured to frame/deframe an optical signal and encode/decode error correction on the optical signal; an optical detector configured to receive an optical signal and convert the optical signal to an electrical signal; decision circuitry configured to receive the electrical signal and to detect information from the electrical signal responsive to a decision threshold; and a plurality of decision threshold states for optimizing the decision threshold responsive to monitored errors from the integrated framing and error correction circuitry. Optionally, the pluggable optical transceiver is compliant to a multi-source agreement, and the integrated framing and error correction circuitry and the plurality of decision threshold states operate without requiring modification in a host device compliant to the multi-source agreement. The multi-source agreement can include one of XFP, XPAK, XENPAK, X2, XFP-E, SFP, SFP+, and 300-pin. The plurality of decision threshold states can include power down, initialize, searching, waiting, tuning, and tuned; and the receiver threshold optimization transitions from the plurality of threshold states responsive to monitored error counts over a predetermined time period. Each of the plurality of decision threshold states applies one or more of a searching action and a tuning action; wherein the searching action includes a coarse modification of the decision threshold; and wherein the tuning action includes a fine modification of the decision threshold.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides systems and methods for a receiver threshold optimization loop to provide self-contained automatic adjustment in a compact module, such as a pluggable optical transceiver. The receiver threshold optimization loop utilizes a performance metric associated with the receiver, such as FEC, to optimize performance of the receiver. The receiver is optimized through a change in the receiver threshold responsive to the performance metric. Advantageously, the present invention provides improved receiver performance through a continuous adjustment that is self-contained within the receiver, such as within a pluggable optical transceiver. The receiver threshold optimization loop can include a fine and a coarse sweep of adjustment from an initial setting.

In an exemplary application, the receiver threshold optimization loop can operate within an MSA-compliant pluggable optical transceiver. Additionally, the pluggable optical transceiver can include integrated FEC which is fully-contained within the pluggable optical transceiver, i.e. the FEC is added. Further, the receiver threshold optimization loop can operate without communication requirements to a host system of the pluggable optical transceiver. Advantageously, this enables improved performance in the pluggable optical transceiver while preserving MSA specification compliance and operation.

Figure 1:
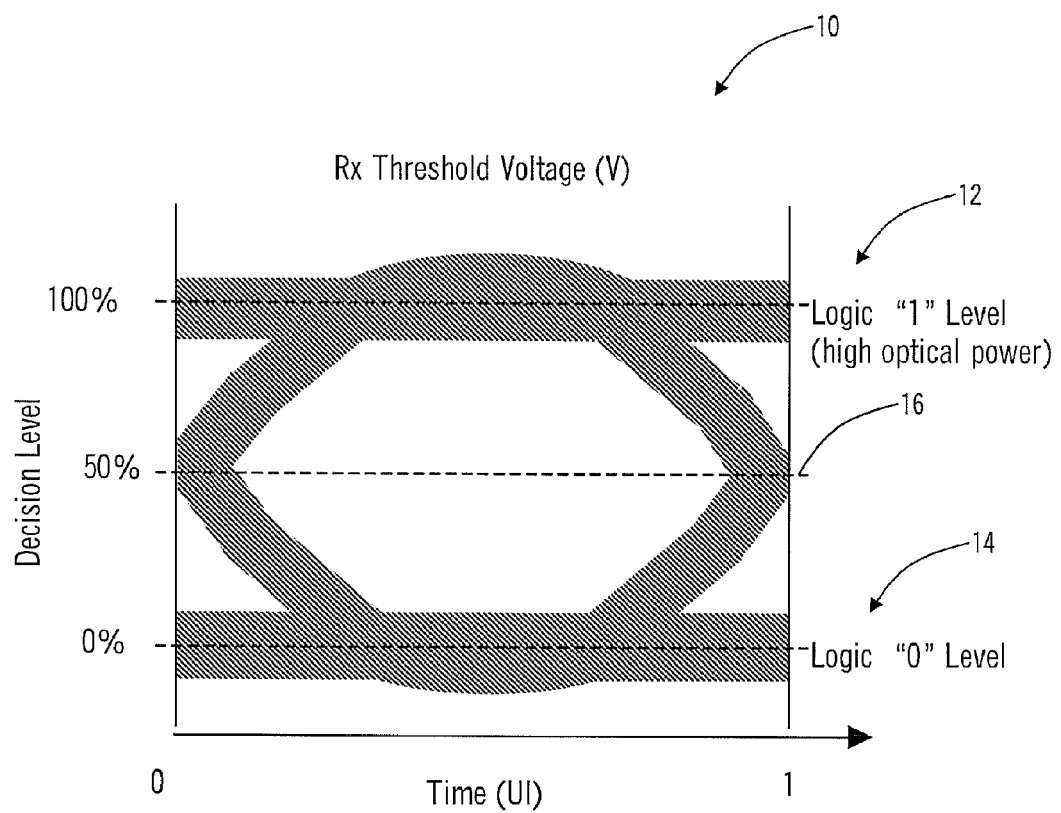
FIG. 1 is an eye diagram of a conventional mechanism for a receiver threshold voltage determination of a receiver.
Figure 2:
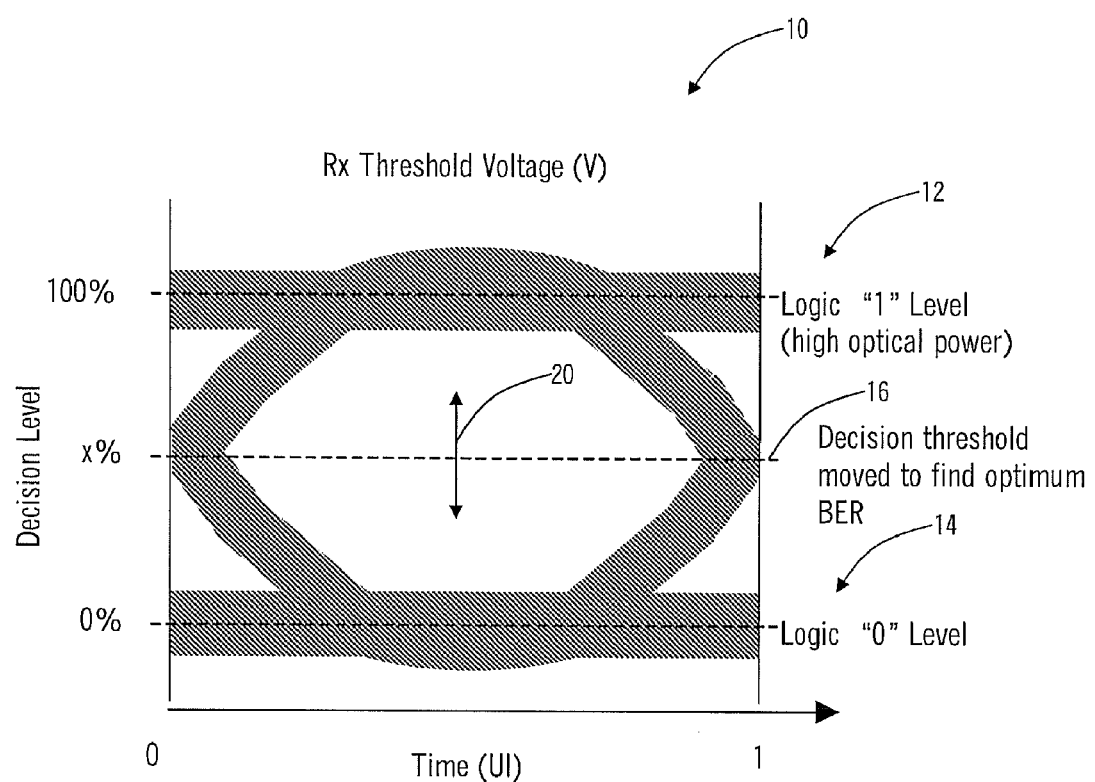
FIG. 2 is the eye diagram of FIG. 1 illustrating a receiver threshold change according to an exemplary embodiment of the present invention.

Referring to FIG. 2, a receiver threshold change 20 is illustrated on the eye diagram 10 according to an exemplary embodiment of the present invention. The receiver threshold change 20 is configured to dynamically adjust the horizontal decision threshold value 16 to an optimum bit error rate (BER). The optimum BER is found using feedback from a performance metric, such as FEC corrected errors. The receiver threshold change 20 is implemented through a receiver decision threshold adjustment algorithm described herein.

The receiver decision threshold adjustment algorithm utilizes the performance metric, such as FEC corrected errors, to optimize the decision threshold value 16 through the receiver threshold change 20. The receiver decision threshold adjustment algorithm begins with a factory default setting which is a preset horizontal decision threshold value 16. The preset horizontal decision threshold value 16 is utilized as a starting point for threshold optimization.

The receiver decision threshold adjustment algorithm can include two modes of optimization including a fine sweep mode and a coarse sweep mode. The fine sweep mode adjusts the decision threshold value 16 for small adjustments to fine-tune receiver performance, and the coarse sweep mode adjusts the decision threshold value 16 to provide an initial starting point for the fine sweep mode. The receiver decision threshold adjustment algorithm can be automatically invoked upon module start-up and can continually adjust the decision threshold value 16 during module operation. Note, the receiver decision threshold adjustment algorithm is configured to be fully self-contained, requiring no external input and output.

Figure 3:
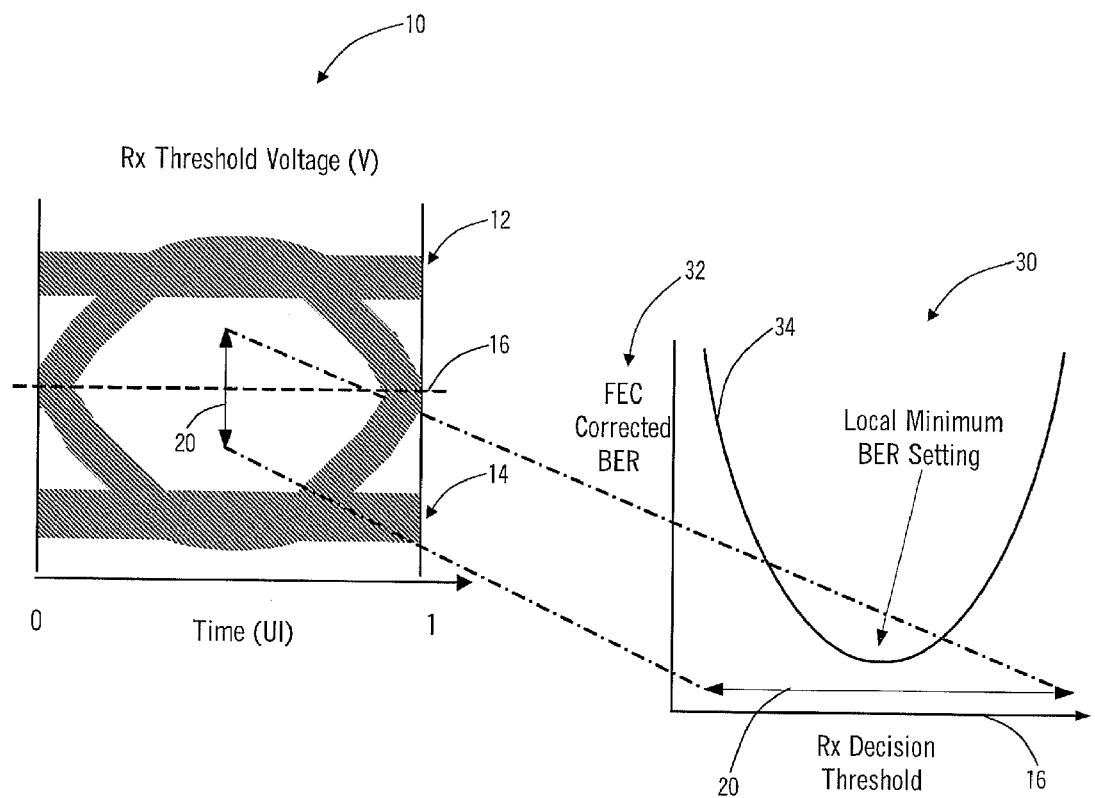
FIG. 3 is a diagram of receiver threshold change on the eye diagram of FIGS. 1 and 2 correlated to FEC corrected BER according to an exemplary embodiment of the present invention.

Referring to FIG. 3, the receiver threshold change 20 on the eye diagram 10 is correlated to FEC corrected BER 32 illustrated in graph 30 according to an exemplary embodiment of the present invention. In this exemplary embodiment, the receiver is configured to track corrected errors through the FEC. The receiver decision threshold adjustment algorithm utilizes the corrected errors count to fine tune the receiver decision threshold 16 point base for the current received signal, i.e. the receiver threshold change 20 is responsive to FEC corrected BER 32.

The graph 30 includes the FEC corrected BER 32 count versus the receiver decision threshold 16 and includes a plot of measured BER 34. The fine sweep routine adjusts the receiver decision threshold 16 in the positive and negative direction, i.e. the receiver threshold change 20, from a current set point. One small step is taken in each direction, and the corrected FEC BER is recorded over a predetermined time interval, such as, e.g., 1 second for each set point. The routine then can select the best BER from all three set points (current, positive and negative) and sets the receiver decision threshold at that lowest FEC corrected BER set point. The routine can then repeat until the best BER is located within the received signal. Within each received eye diagram 10, the fine sweep of the receiver threshold 16 reveals a FEC corrected BER curve 34 containing a local minimum optimum setting. The fine sweep routine is designed such that this local minimum is found over time and to continuously optimize the performance if the received signal changes.

Figure 4:
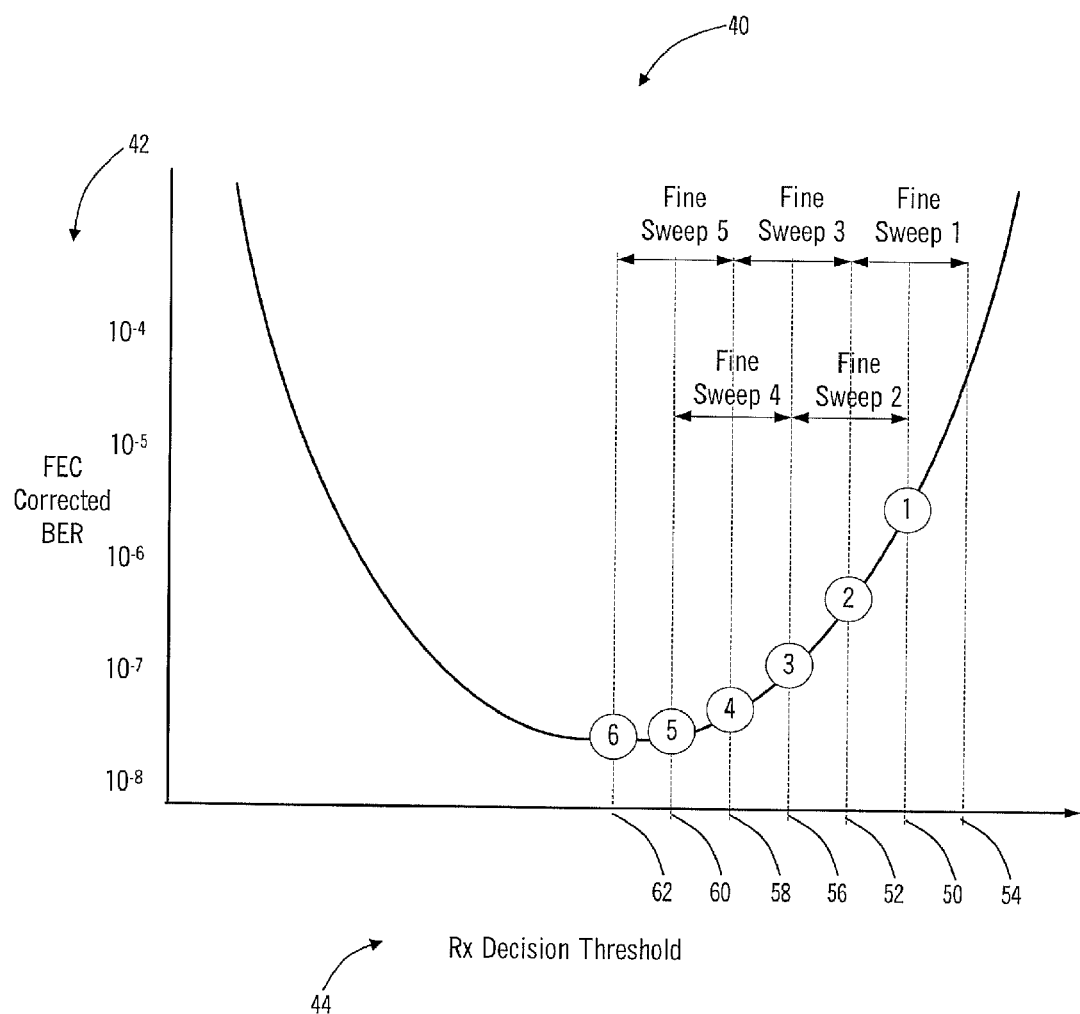
FIG. 4 is a graph of an exemplary operation of a fine sweep routine to converge on a local minimum BER setting according to an exemplary embodiment of the present invention.

Referring to FIG. 4, a graph illustrates an exemplary operation 40 of the fine sweep routine to converge on a local minimum BER setting according to an exemplary embodiment of the present invention. The graph includes a plot of FEC corrected BER 42 versus receiver decision threshold value 44. The receiver decision threshold 16 is initially set at point 50 with an associated FEC corrected BER at approximately $10^{-5}$. A first fine sweep (denoted by Fine Sweep 1) is performed by setting the receiver decision threshold 16 at points 52, 54. Accordingly, the associated FEC corrected BER is measured at both the points 52, 54, and a new optimized receiver decision threshold setting with the lower FEC corrected BER of points 52, 54 is selected at point 52.

In the exemplary operation 40, the fine sweep algorithm is performed five times, denoted by Fine Sweeps 1-5 and points 50-62. Each of the Fine Sweeps 1-5 selects a different receiver decision threshold 16 at adjacent points 50-62, measures the associated FEC corrected BER at each of the points 50-62, and selects the optimal point 50-62 based on the best FEC corrected BER. After the Fine Sweep 5, the exemplary operation 40 converges to point 62 which represents the receiver decision threshold 16 with the best FEC corrected BER. Additionally, the Fine Sweep algorithm can continuously run, always selecting the best available corrected FEC BER and adapting to signal changes.

If at any time during the Fine Sweep loop the corrected BER falls below $10^{-8}$ (e.g., $10^{-9}$) or about 100 corrected FEC errors in one second, the loop can be halted and the received corrected FEC error rate can be read every second without receiver decision threshold adjustments. If the corrected error rate again rises above $10^{-8}$ (e.g., $10^{-6}$), the Fine Sweep algorithm again can be started again to find the most optimal operating point.

If a loss-of-signal (LOS) or low power input condition is observed during the Fine Sweep algorithm, the factory default decision threshold setting can be immediately applied. When the LOS or low power condition clears and the receiver has frame synchronization and FEC corrected error counts are valid, the Fine Sweep routine can be again invoked.

Figure 5:
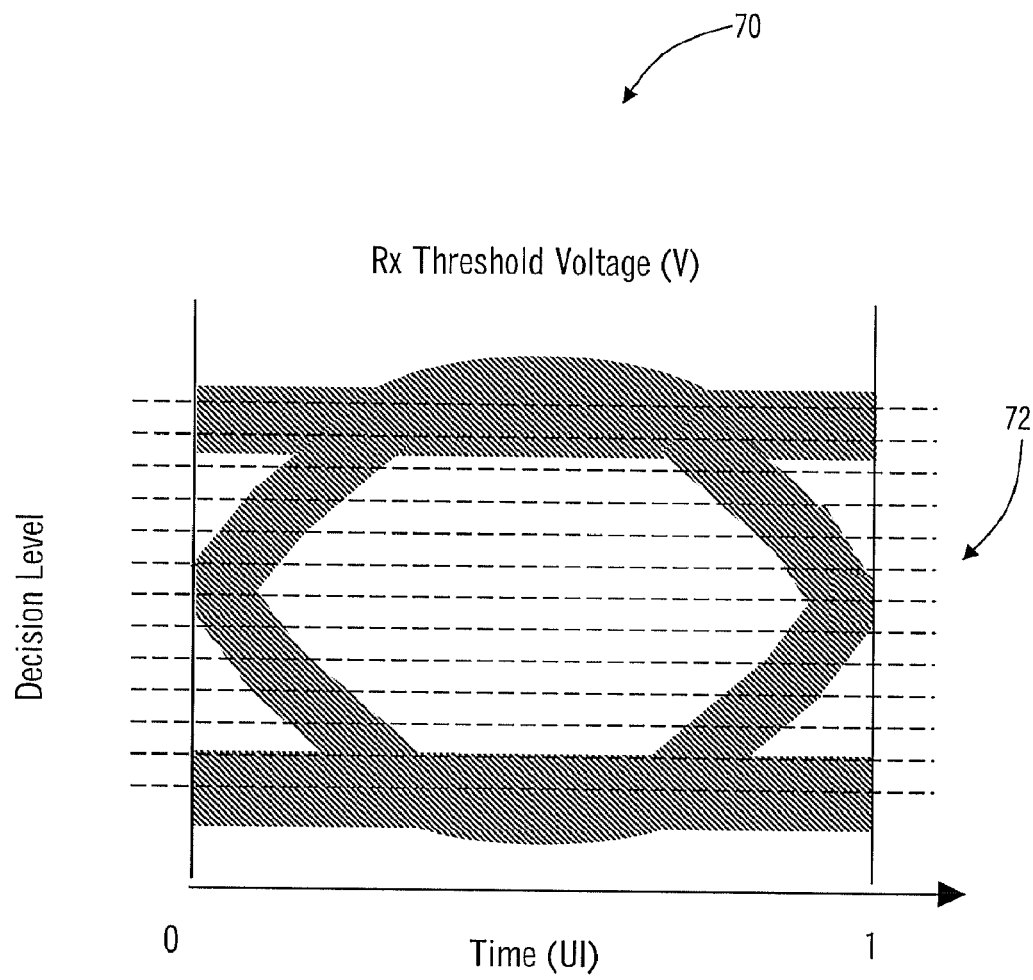
FIG. 5 is an eye diagram showing a coarse sweep algorithm according to an exemplary embodiment of the present invention.

Referring to FIG. 5, an eye diagram 70 illustrates a coarse sweep algorithm according to an exemplary embodiment of the present invention. The coarse sweep algorithm can be invoked if a loss-of-frame LOF or if an out-of-frame (OOF) condition occurs in a predetermined time period, such as, e.g., two consecutive seconds during the receiver threshold fine loop operation. The coarse sweep algorithm is configured to find the initial starting point for the fine sweep loop if the module loses frame during the receiver decision threshold adjustments.

Optionally, the coarse sweep loop is not invoked if the initial factory default setting applied to the module results in frame lock and valid FEC corrected error rate measurements. Alternatively, the coarse sweep loop can be utilized to find an initial default setting. During the coarse sweep routine the receiver decision threshold 16 sweeps across the eye opening in a predetermined number of equal and sequential steps 72, such as, e.g., 13 steps as depicted in FIG. 5. During each decision threshold setting 16 at the steps 72, the FEC corrected BER is calculated over a predetermined time period, such as, e.g., one second. Once the coarse adjustment is completed across the entire range, the decision threshold setting with the lowest corrected FEC BER is set in the module. Once the coarse sweep routine completes, the fine sweep loop invokes to continuously fine tune the received decision threshold In the case of a LOS or low power condition, the receiver can be immediately placed to the factory default setting. If a valid frame and FEC corrected error counts are received, the fine sweep loop can be called.

The following truth table illustrates an exemplary embodiment of different receive decision threshold states:

| LOS | LOF | OOF | Received Decision Threshold State |
|---|---|---|---|
| T | X | X | Factory Default |
| F | T | X | Coarse Tune |
| F | F | T[1] | Coarse Tune |
| F | F | F | Fine Tune |

[1]OOF in this case is described as having OOF during any point in two consecutive seconds. If OOF is continuously observed for 3 ms, the LOF is raised to initiate the coarse loop if the module is not under a LOS condition.

Referring to FIGS. 6-9, state diagrams 100, 102, 104, 106 are illustrated for a receiver decision setting algorithm and modulator bias control according to various exemplary embodiments of the present invention. The state diagrams illustrate autonomous operation for adjusting the receiver decision threshold based upon measured error counts. The state diagrams 100, 102, 104, 106 represent actions taken by a receiver to dynamically adjust a decision threshold responsive to a number of corrected errors, LOS, LOF, etc. In an exemplary embodiment, the state diagrams 100, 102, 104, 106 are performed by circuitry coupled to or within a receiver in an integrated module, such as a pluggable optical transceiver. Further, the integrated module includes framing and error correction circuitry within the module.

Figure 6:
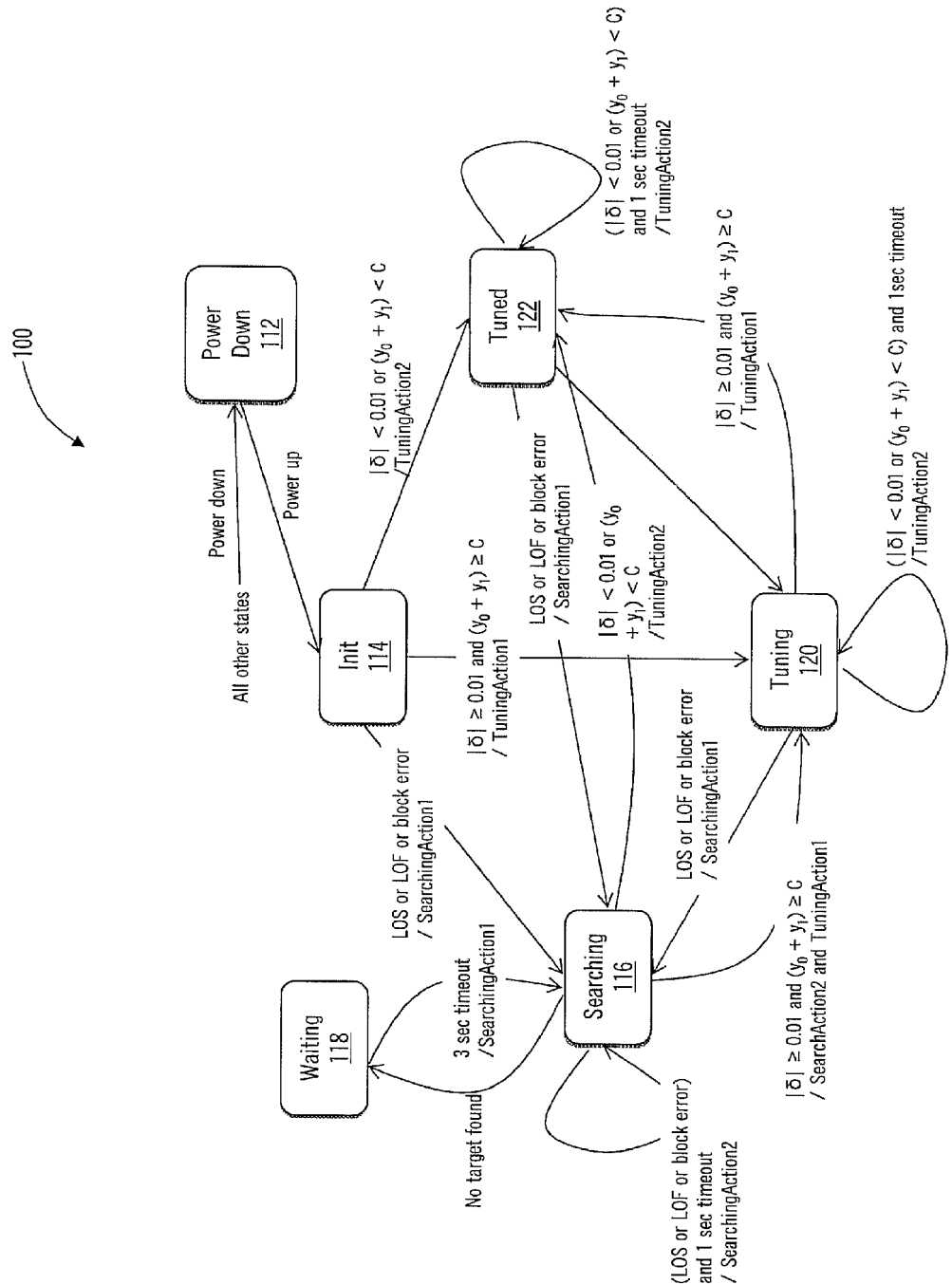
FIG. 6 is a state diagram of an exemplary embodiment of a finite state machine for a receiver decision threshold setting according to an exemplary embodiment of the present invention.

FIG. 6 illustrates state diagram 100 of an exemplary embodiment of a finite state machine for a receiver decision threshold setting. The state diagram 100 include a power down state 112, an initialize state 114, a searching state 116, a waiting state 118, a tuning state 120, and a tuned state 122. The power down state 112 is where the receiver is off or receiving no signal and all other states can enter the power down state 112. Upon power up, the receiver enters the initialize state 114 from the power down state 112.

The state diagram 100 utilizes the following variables and adjustment factors:

| | |
|---|---|
| $y_0$ | number of logical 0's corrected in a predetermined interval |
| $y_1$ | number of logical 1's corrected in a predetermined interval |
| $\delta$ | $(y_0 - y_1)/(y_0 + y_1)$ |
| C | Lower bound on total number of corrected errors |
| Tuning Action 1 | Apply a bias of $32\delta$ |
| Tuning Action 2 | Apply a bias of $2\delta/|\delta|$ |
| Searching Action 1 | Apply a value of 0 |
| Searching Action 2 | Apply a value of +200 |

These variables are collected based on framing and error correction within the module, and the value and bias are applied to the receiver decision threshold accordingly. In an exemplary embodiment, the predetermined interval can be 1 s. Also, the parameters in the actions can be applied to a digital to analog converter (DAC) to adjust the value of the receiver threshold.

At the initialize state 114, the receiver can either enter the searching state 116, the tuning state 120, or the tuned state 122 responsive to the framing and error correction. If there is LOS, LOF, or block errors, the receiver enters the searching state 116 and performs the searching action 1, i.e. applies a value of 0 to the decision threshold. This corresponds to a coarse sweep to find an initial point for the receiver decision threshold.

The initialize state 114 can enter the tuning state 120 if $|\delta| \geq 0.01$ and $(y_0+y_1) \geq C$, i.e. frame lock is achieved and error counts are high. Here, the tuning action 1 is performed. The initialize state 114 can enter the tuned state 122 if $|\delta| < 0.01$ and $(y_0+y_1) < C$, i.e. frame lock is achieved and error counts are relatively low. Here, the tuning action 2 is performed.

At the searching state 116 after the searching action 1, the searching state 116 can enter the waiting state 118 if no target is found, perform a searching action 2 if there is still LOS, LOF, or block errors after a predetermined period, such as 1 s, enter the tuned state 122, or enter the tuning state if $|\delta| \geq 0.01$ and $(y_0+y_1) \geq C$. Here, the searching state is looking for some point of the decision threshold that generates the lowest number of corrected errors (with no LOF/OOF condition) among all of the searched points. On the contrary, if all of the points generate a LOF/OOF condition, then no target is found. The target is referring to the best point in all of the points searched. In the waiting state 118, there is a predetermined timeout period, such as, e.g., 3 s, and the searching action 1 is performed.

If there is a frame lock and a received error count, then the searching state 116 can enter the tuning state 120 or tuned state 122 responsive to the received errors. If $|\delta| \geq 0.01$ and $(y_0+y_1) \geq C$, then the tuning state 120 is entered. This corresponds to a relatively large number of corrected errors, i.e. 100 in a predetermined period. Here, the searching action 2 and tuning action 1 are performed. Conversely, if $|\delta| < 0.01$ and $(y_0+y_1) < C$, then the tuned state 122 is entered corresponding to an optimized decision threshold. Note, the values of $|\delta|$, $y_0$, $y_1$, and C can be adjusted as required. Here, the tuning action 2 is performed.

At the tuning state 120, the searching state 116 can be entered responsive to LOS, LOF, or block errors, the tuned state 122 can be entered responsive to low error counts, and the tuning state 120 can repeat to continue decision threshold tuning. If $|\delta| < 0.01$ and $(y_0+y_1) < C$, the tuning state 120 enters the tuned state 122 and performs tuning action 1. If $|\delta| < 0.01$ and $(y_0+y_1) < C$, the tuning state 120 repeats and performs the tuning action 2 after a predetermined timeout period. If $|\delta| > 0.01$ and $(y_0+y_1) \geq C$, the tuning state 120 enters the tuned state and performs the tuning action 1.

At the tuned state 122, the searching state 116 can be entered responsive to LOS, LOF, or block errors, the tuning state 120 can be entered responsive to high error counts, and the tuned state 122 can repeat to continue fine tuning of the decision threshold. If $|\delta| > 0.01$ and $(y_0+y_1) \geq C$, the tuned state 122 enters the tuning state 120 and performs tuning action 2. If $|\delta| < 0.01$ and $(y_0+y_1) < C$, the tuned state 122 repeats and performs tuning action 2 after a predetermined timeout period.

Figure 7:
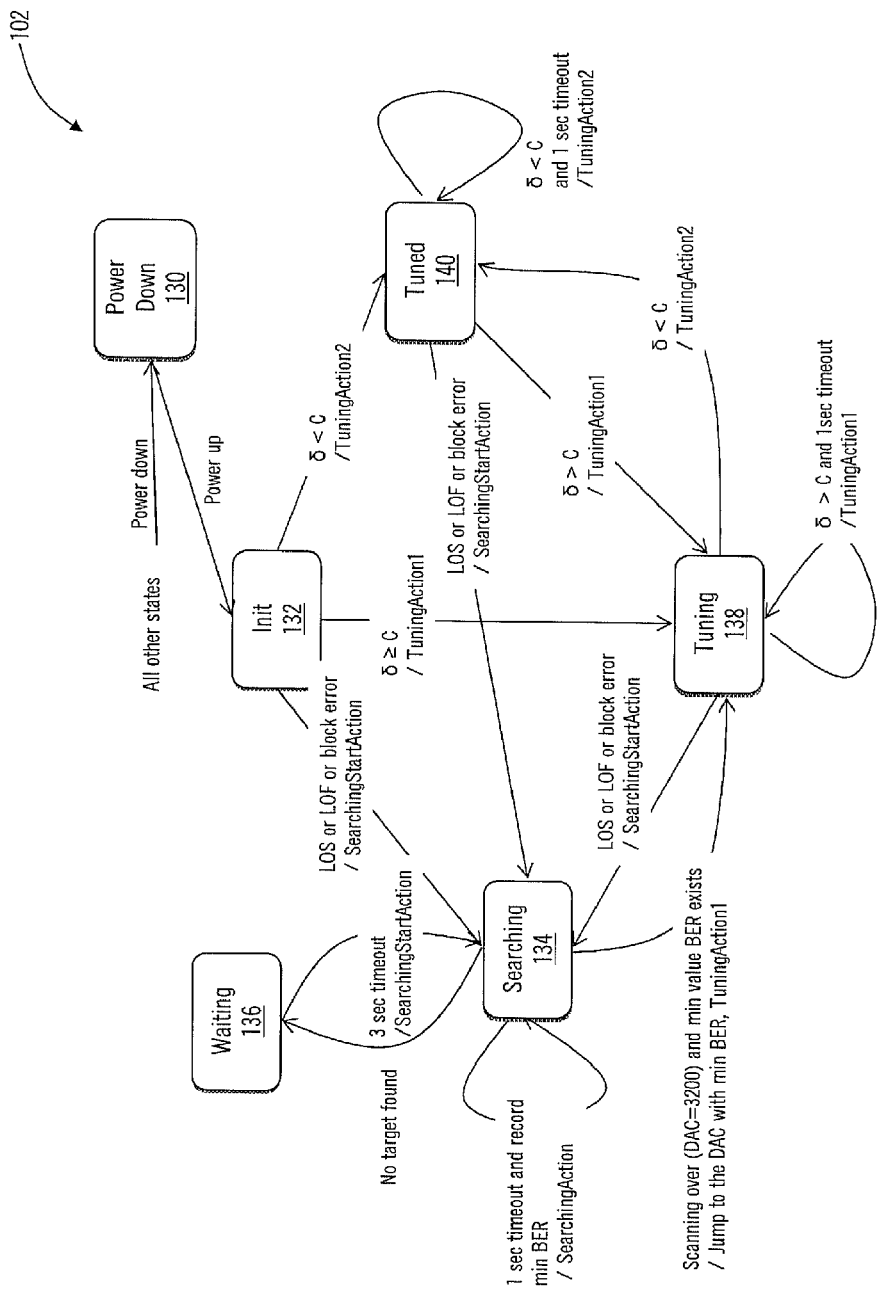
FIG. 7 is a state diagram of another exemplary embodiment of a finite state machine for a receiver decision threshold setting according to an exemplary embodiment of the present invention.

FIG. 7 illustrates state diagram 102 of another exemplary embodiment of a finite state machine for a receiver decision threshold setting. The state diagram 102 include a power down state 130, an initialize state 132, a searching state 134, a waiting state 136, a tuning state 138, and a tuned state 140. The power down state 130 is where the receiver is off or receiving no signal and all other states can enter the power down state 130. Upon power up, the receiver enters the initialize state 132 from the power down state 130.

The state diagram 102 utilizes the following variables and adjustment factors:

| | |
|---|---|
| $\delta$ | total number of errors collected in a predetermined interval |
| C | threshold of total corrected errors |
| Tuning Action 1 | dynamically apply a bias of 16 based on the tuning result |
| Tuning Action 2 | dynamically apply a bias of 8 based on the tuning result; moving average is used for previous value |
| Searching Start Action | Apply a value of 800 |
| Searching Action | Apply a value of +200 |

These variables are collected based on framing and error correction within the module, and the value and bias are applied to the receiver decision threshold accordingly. In an exemplary embodiment, the predetermined interval can be 1 s, and the threshold value C can be 100 which can be adjusted. Also, the parameters in the actions can be applied to a digital to analog converter (DAC) to adjust the value of the receiver threshold.

At the initialize state 132, the receiver can either enter the searching state 134, the tuning state 138, or the tuned state 140 responsive to the framing and error correction. If there is LOS, LOF, or block errors, the receiver enters the searching state 116 and performs the searching start action, i.e. applies a value of 800 to the decision threshold. This corresponds to a coarse sweep to find an initial point for the receiver decision threshold. The initialize state 132 can enter the tuning state 138 if $\delta \geq C$, i.e. frame lock is achieved and error counts are high. Here, the tuning action 1 is performed. The initialize state 132 can enter the tuned state 140 if $\delta < C$, i.e. frame lock is achieved and error counts are relatively low. Here, the timing action 2 is performed.

At the searching state 134 after the searching start action, the searching state 134 can enter the waiting state 136 if no target is found, perform the searching action if there is still LOS, LOF, or block errors after a predetermined period, such as 1 s, enter the tuned state 140, or enter the tuning state 138. Here, the searching state is looking for some point of the decision threshold that generates the lowest number of corrected errors (with no LOF/OOF condition) among all of the searched points. On the contrary, if all of the points generate a LOF/OOF condition, then no target is found. The target is referring to the best point in all of the points searched. In the waiting state 136, there is a predetermined timeout period, such as, e.g., 3 s, and the searching start action is performed.

If there is a frame lock and a received error count, then the searching state 134 can enter the tuning state 138 or timed state 140 responsive to the received errors. If $\delta \geq C$, then the tuning state 138 is entered. This corresponds to a relatively large number of corrected errors, e.g. 100 in a predetermined period. Here, the decision threshold, e.g. set with a digital-analog converter (DAC) is set at a minimum BER based on scanning through various settings. Conversely, if $\delta < C$, then the tuned state 140 is entered corresponding to an optimized decision threshold. Note, the values of $\delta$ and C can be adjusted as required.

At the tuning state 138, the searching state 134 can be entered responsive to LOS, LOF, or block errors, the tuned state 140 can be entered responsive to low error counts, and the tuning state 138 can repeat to continue decision threshold tuning. If $\delta < C$, the tuning state 138 enters the tuned state 140 and performs tuning action 2. If $\delta > C$, the tuning state 138 repeats and performs the tuning action 1 after a predetermined timeout period.

At the tuned state 140, the searching state 134 can be entered responsive to LOS, LOF, or block errors, the tuning state 138 can be entered responsive to high error counts, and the tuned state 140 can repeat to continue fine tuning of the decision threshold. If $\delta > C$, the tuned state 140 enters the tuning state 138 and performs tuning action 1. If $\delta < C$, the tuned state 140 repeats and performs tuning action 2 after a predetermined timeout period.

Figure 8:
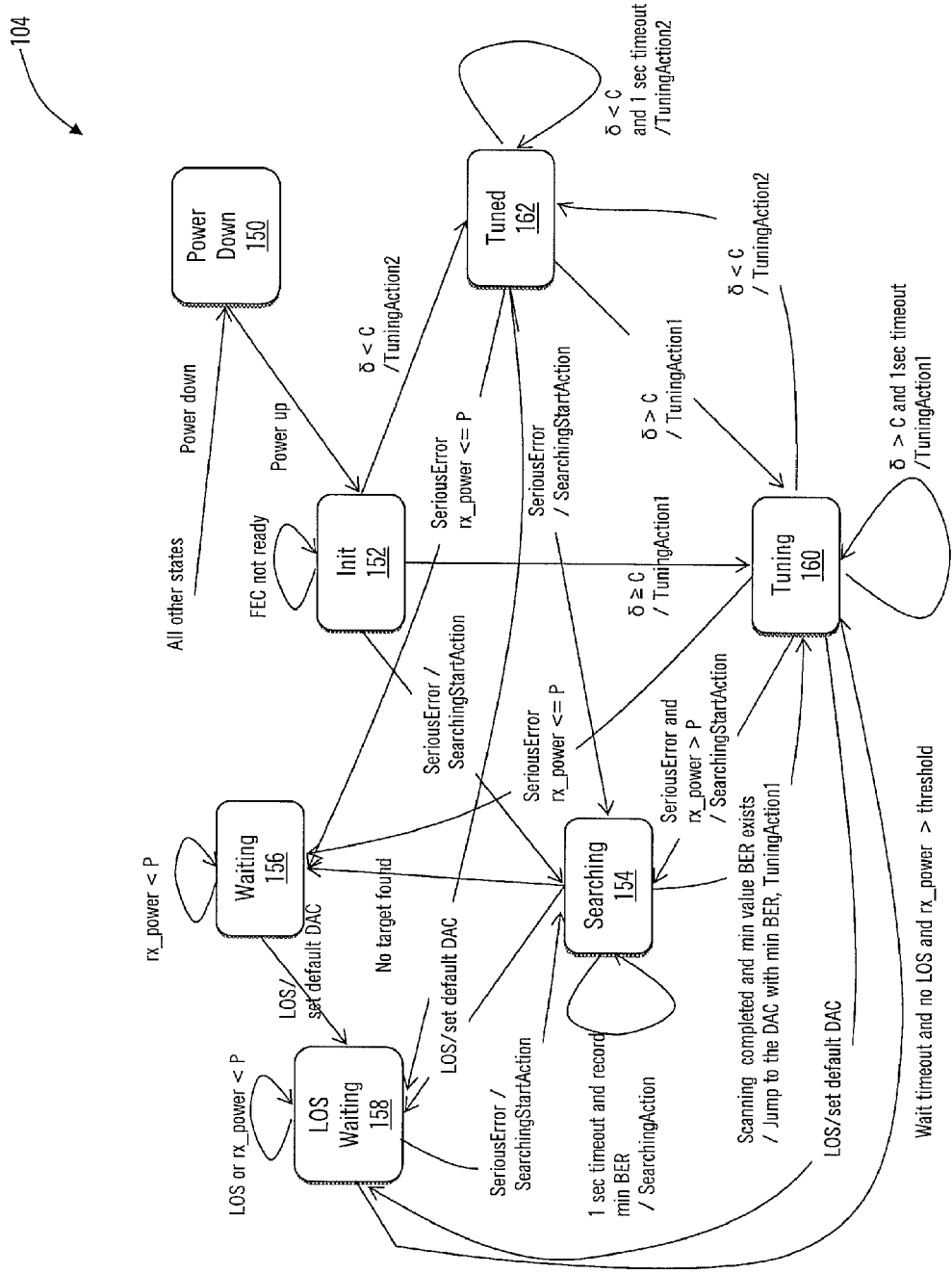
FIG. 8 is a state diagram of yet another exemplary embodiment of a finite state machine for a receiver decision threshold setting according to an exemplary embodiment of the present invention.

FIG. 8 illustrates state diagram 104 of yet another exemplary embodiment of a finite state machine for a receiver decision threshold setting. The state diagram 104 include a power down state 150, an initialize state 152, a searching state 154, a waiting state 156, an LOS waiting state 158, a tuning state 160, and a tuned state 162. The power down state 150 is where the receiver is off or receiving no signal and all other states can enter the power down state 150. Upon power up, the receiver enters the initialize state 152 from the power down state 150.

The state diagram 104 utilizes the following variables and adjustment factors:

| | |
|---|---|
| δ | total number of errors collected in a predetermined interval |
| C | threshold of total corrected errors |
| P | threshold of the received power, below which no searching will be conducted |
| Tuning Action 1 | dynamically apply a bias of 16 based on the tuning result |
| Tuning Action 2 | No action for now |
| Searching Start Action | Apply a value of 800 |
| Searching Action | Apply a value of +200 |
| Serious Error | OOF, LOF, or block errors and RX power > threshold |

These variables are collected based on framing and error correction within the module, and the value and bias are applied to the receiver decision threshold accordingly. In an exemplary embodiment, the predetermined interval can be 1 s, and the threshold value C can be 100 which can be adjusted. Also, the parameters in the actions can be applied to a digital to analog converter (DAC) to adjust the value of the receiver threshold.

At the initialize state 152, the receiver can either enter the searching state 154, the tuning state 160, the tuned state 162, or remain in the initialize state 152 responsive to the framing and error correction. If there is a serious error, the receiver enters the searching state 152 and performs the searching start action, i.e. applies a value of 800 to the decision threshold. This corresponds to a coarse sweep to find an initial point for the receiver decision threshold. The initialize state 152 can enter the tuning state 160 if δ≥C, i.e. frame lock is achieved and error counts are high. Here, the tuning action 1 is performed. The initialize state 152 can enter the tuned state 162 if δ<C, i.e. frame lock is achieved and error counts are relatively low. Here, the tuning action 2 is performed. If the FEC is not ready, the initialize state 152 repeats.

At the searching state 154 after the searching start action, the searching state 154 can enter the waiting state 156 if no target is found, perform the searching action if there is a serious error after a predetermined period, such as 1 s, or enter the LOS waiting state 158. Here, the searching state is looking for some point of the decision threshold that generates the lowest number of corrected errors (with no LOF/OOF condition) among all of the searched points. On the contrary, if all of the points generate a LOF/OOF condition, then no target is found. The target is referring to the best point in all of the points searched. In the waiting state 136, there is a predetermined timeout period, such as, e.g., 3 s, and the searching action 1 is performed. If there is LOS, the searching state 154 enters the LOS waiting state 158 until a signal is received. Once a signal is received, the LOS waiting state 158 can enter the searching state 154 if there is a serious error to perform searching start action or the tuning state 160 if there is no LOS and RX power>threshold.

If there is a frame lock and a received error count, then the searching state 154 can enter the tuning state 160 or tuned state 162 responsive to the received errors. If scanning is complete and there is a minimum value BER, the tuning state 138 is entered setting the DAC (i.e., receiver threshold value) to the minimum BER value setting. This corresponds to a relatively large number of corrected errors, e.g. 100 in a predetermined period. Here, the decision threshold, e.g. set with the DAC is set at a minimum BER based on scanning through various settings. Note, the values of δ and C can be adjusted as required.

At the tuning state 160, the searching state 154 can be entered responsive to a serious error, the tuned state 162 can be entered responsive to low error counts, the tuning state 160 can repeat to continue decision threshold tuning, the waiting state can be entered responsive to a serious error and low power, and the LOS waiting state 158 can be entered responsive to LOS. If δ<C, the tuning state 160 enters the tuned state 162 and performs tuning action 2. If δ>C, the tuning state 160 repeats and performs the tuning action 1 after a predetermined timeout period.

At the tuned state 162, the searching state 154 can be entered responsive to a serious error, the tuning state 160 can be entered responsive to high error counts, and the tuned state 162 can repeat to continue fine tuning of the decision threshold. If δ>C, the tuned state 162 enters the tuning state 160 and performs tuning action 1. If δ<C, the tuned state 162 repeats and performs tuning action 2 after a predetermined timeout period.

Of note, the state diagrams 102, 104 utilize a total number of errors, and not the total number of corrected logical ones and zeros. Accordingly, these state diagrams 102, 104 can be applied in any modulation scheme, i.e. they are not limited to simple on-off keying schemes. For example, using total number of corrected errors can be necessary because the FEC may be behind a scrambler, and the number of ones and zeros is then always equal due to the scrambler, which is not a useful piece of information. The state diagrams 102, 104 can be utilized with a variety of modulation formats in a receiver, such as, phase modulation, multi-level coding, and the like.

Figure 9:
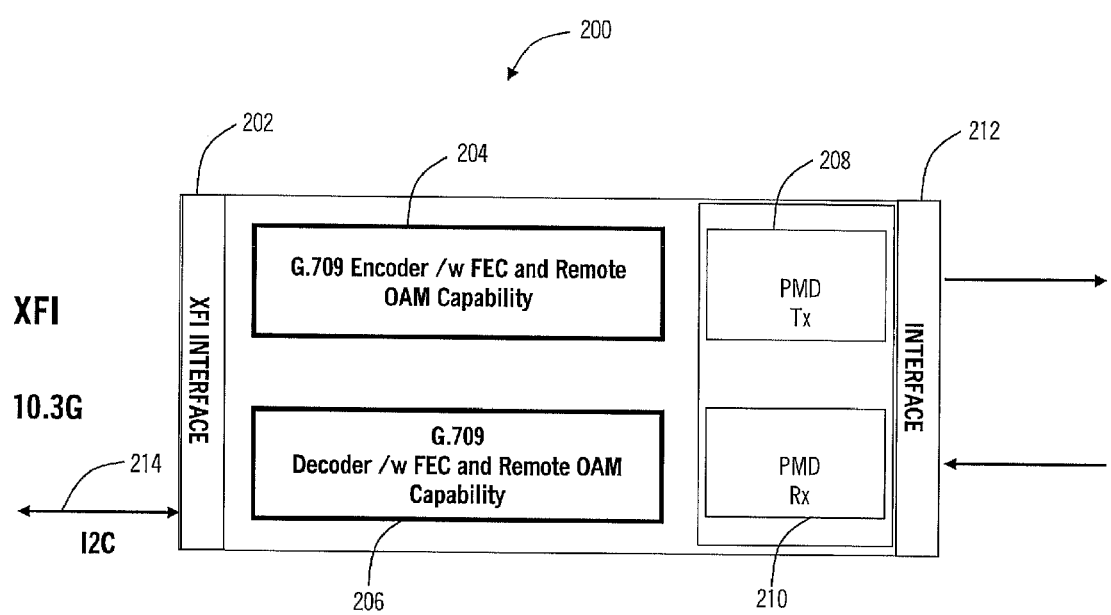
FIG. 9 is a diagram of an XFP pluggable transceiver with integrated FEC and framing circuitry which can be utilized to provide the receiver decision threshold adjustment according to an exemplary embodiment of the present invention.

Referring to FIG. 9, an XFP pluggable transceiver 200 is illustrated with integrated FEC and framing circuitry which can be utilized to provide the receiver decision threshold adjustment according to an exemplary embodiment of the present invention. The XFP pluggable transceiver 200 is configured to plug into any device configured to accept MSA-complaint transceivers, such as CPE routers/switches, etc. The pluggable transceiver 200 is utilized provide optical capability in a host device. Here, the host device is configured to utilize XFP devices based on the MSA specification. The pluggable transceiver 200 includes additional circuitry to provide G.709 framing, FEC, and remote OAM&P capabilities. The host device requires no hardware or software modification. Rather, the G.709 framing, FEC, and remote OAM&P capabilities are completely integrated within the pluggable transceiver 200 providing improved optical performance and monitoring capability. Additionally, the receiver decision threshold can be adjusted responsive to the error correction and framing. The receiver decision threshold adjustment presented herein can be utilized with an optical receiver known in the art. The XFP pluggable transceiver 200 with integrated framing and FEC circuitry is one exemplary application. Also, other MSA-type pluggable transceivers (i.e. XPAK, XENPAK, X2, XFP-E, SFP, and SFP+) can also be utilized with similar received decision threshold adjustment functionality.

The XFP pluggable transceiver 200 includes an XFI interface 202 configured to interconnect to the host device in a host system. The XFI interface 202 is configured to transmit/receive a 10.3 Gb/s signal to/from the host system. The XFI interface 202 connects to both a G.709 encoder 204 and a G.709 decoder 206. The G.709 encoder 204 includes FEC, Remote OAM capability, G.709 framing, SERDES, and CDR functionality. The G.709 encoder 204 is configured to receive a signal from the XFI interface 202, such as an Ethernet client or the like, and provide framing, OAM&P processing, and FEC encoding. The G.709 decoder 206 includes FEC, remote OAM capability, G.709 de-framing, SERDES, and CDR functionality as described herein. The G.709 decoder 206 is configured to de-frame a G.709 signal, process OAM&P, and decode FEC and to provide a signal, such as an Ethernet client or the like, to the XFI interface 202. The G.709 decoder 206 can provide statistics associated with the corrected errors to allow the receiver decision threshold adjustment. Additionally, the receiver decision threshold adjustment can be implemented within the G.709 decoder 206 or the like.

The XFP pluggable transceiver 200 includes a Physical Medium Dependent (PMD) transmitter (Tx) and receiver (Rx) 208,210. The PMD Tx 208 is configured to receive a framed signal from the G.709 encoder 204 and transmit an optical signal on an interface 212. For example, the interface 212 can include an XFI interface, a parallel interface, or the like. The PMD Rx 210 is configured to receive an optical signal on the interface 212 and to provide the received optical signal to the G.709 decoder 206. The PMD Rx 210 includes an optical detector which converts a received optical signal into an electrical signal which is processed by receiver circuitry including a decision circuit. The decision circuit is configured to receive and store error counts from the G.709 decoder 206. These error counts are used to adjust the receiver decision threshold in the decision circuit as described herein. The PMD Tx/Rx 208,210 can include 850 nm, 1310 nm, 1550 nm, DWDM, CWDM, and the like depending on the application requirements.

The XFP pluggable transceiver 200 is configured to interface to any host device configured to operate with pluggable transceivers compliant to the XFP MSA. For example, the host device can include a router, switch, optical network element, and the like. The host device can include customer premises equipment (CPE) and service provider equipment. The XFP pluggable transceiver 200 includes an I2C interface 214 for communications with the host device. The XFP pluggable transceiver 200 is configured to utilize the communications detailed in the XFP MSA specification. Advantageously, the receiver threshold adjustments described herein do not require communication to/from the host device over the I2C interface 214.

When the XFP pluggable transceiver 200 is configured in a CPE device or other remote device, the XFP pluggable transceiver 200 can be configured to only provide standard XFP MSA-based communications over the I2C interface 1814 to the host device. Accordingly, the host device is unaware of the additional framing, FEC, and OAM&P functionality. This enables any XFP-compliant host device to utilize the XFP pluggable transceiver 200 with the additional benefits of framing, FEC, and dynamic threshold decision adjustment.

When the XFP pluggable transceiver 200 is configured in a service provider device or the like, the XFP pluggable transceiver 200 can configured to provide standard XFP MSA-based communications and G.709 OAM&P information over the I2C interface 214. Here, the host device can be configured to utilize the I2C interface 214 for G.709 OAM&P management of the pluggable transceiver 200 in the host device and for remote far-end management of another pluggable transceiver 200 over a closed loop communication channel. The I2C interface 214 is configured for access to OTN alarms, PMs, and overhead. This requires software modification of the host device to read data off the I2C interface 214, but no additional hardware modifications.

Figure 10:
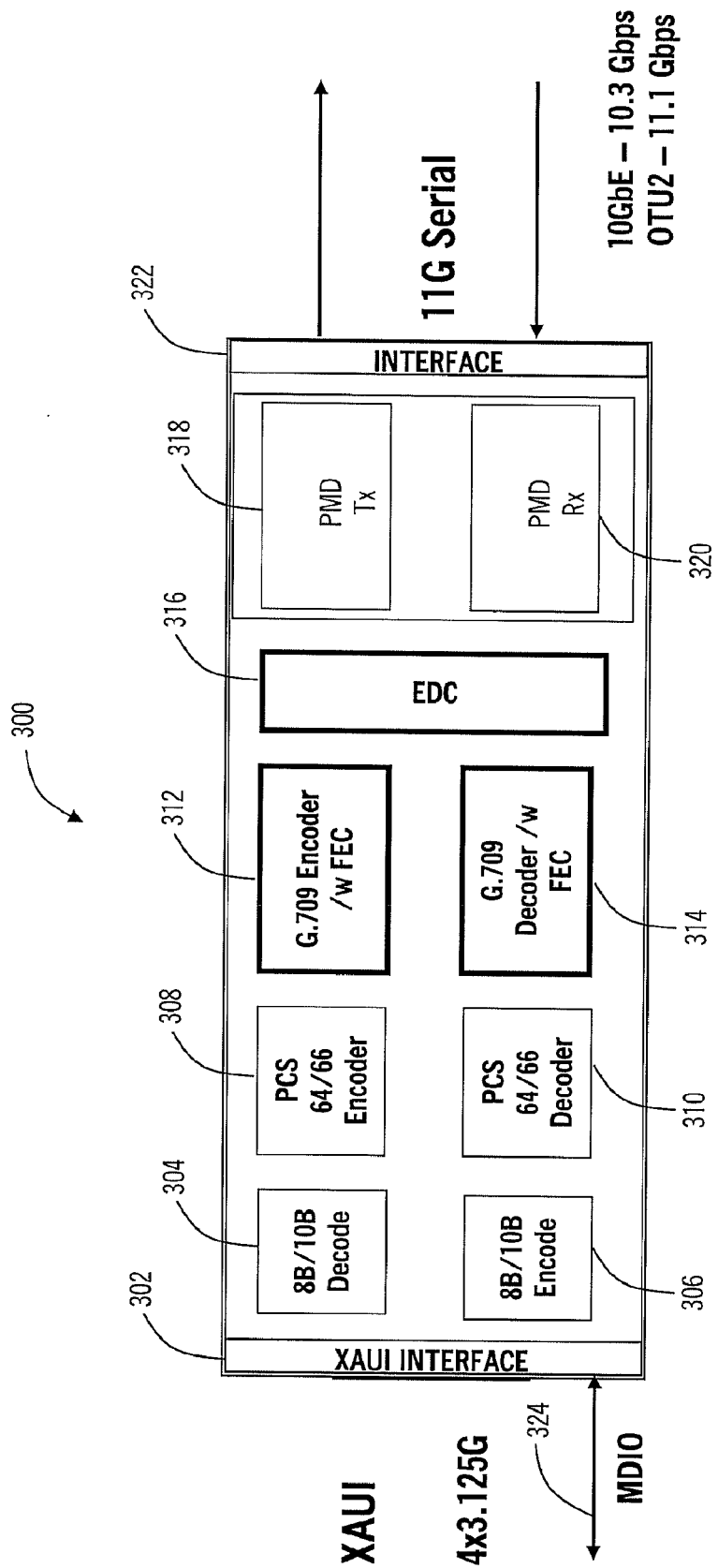
FIG. 10 is a diagram of a XENPAK pluggable transceiver with integrated FEC and framing circuitry which can be utilized to provide the receiver decision threshold adjustment according to an exemplary embodiment of the present invention.

Referring to FIG. 10, a XENPAK pluggable transceiver 300 is illustrated with integrated FEC and framing circuitry which can be utilized to provide the receiver decision threshold adjustment according to an exemplary embodiment of the present invention. The XENPAK pluggable transceiver 300 is configured to plug into any device configured to accept XENPAK-complaint transceivers, such as CPE routers/switches, etc. The XENPAK pluggable transceiver 300 is utilized to provide optical connectivity at a host device. Here, the host device is configured to utilize XENPAK devices based on the MSA specification. The XENPAK pluggable transceiver 300 also includes additional circuitry to provide G.709 framing, FEC, and remote OAM&P capabilities. The host device requires no hardware or software modification. Rather, the G.709 framing, FEC, and remote OAM&P capabilities are completely integrated within the XENPAK pluggable transceiver 300 providing improved optical performance and monitoring capability. Additionally, the receiver decision threshold can be adjusted responsive to the error correction and framing.

The XENPAK pluggable transceiver 300 includes a XAUI interface 302 configured to interconnect to a host device in a host system. The XAUI interface 302 is configured to transmit/receive a 4×3.125 Gb/s signal to/from the host system. The XAUI interface 302 connects to both an 8B/10B decoder 304 and an 8B/10B encoder 306 which are configured to perform 8B/10B decoding and encoding, respectively, on a signal from/to the XAUI interface 302. The 8B/10B decoder 304 connects to a PCS 64/66 encoder 308 configured to perform 64/66 encoding on the output signal from the 8B/10B decoder 304. The 8B/10B encoder 306 receives an input signal from a PCS 64/66 decoder 310 which is configured to perform 64/66 decoding.

The XENPAK pluggable transceiver 300 includes a G.709 encoder with FEC 312 and a G.709 decoder with FEC 314. The G.709 encoder 312 includes FEC, Remote OAM capability, G.709 framing, SERDES, and CDR functionality. The G.709 encoder 312 is configured to receive a signal from the PCS 64/66 encoder 308, such as an Ethernet client or the like, and provide framing, OAM&P processing, and FEC encoding. The G.709 decoder 314 includes FEC, remote OAM capability, G.709 de-framing, SERDES, and CDR functionality. The G.709 decoder 314 is configured to de-frame a G.709 signal, process OAM&P, and decode FEC and to provide a signal, such as an Ethernet client or the like, to the PCS 64/66 decoder 310. Optionally, the XENPAK pluggable transceiver 300 can include an EDC 316 configured to perform electronic dispersion compensation. The G.709 decoder 314 can provide corrected error counts and the like to perform the receiver decision threshold adjustment described herein.

The XENPAK pluggable transceiver 300 includes a Physical Medium Dependent (PMD) transmitter (Tx) and receiver (Rx) 318,320. The PMD Tx 318 is configured to receive a framed signal from the G.709 encoder 312 (or the EDC 316) and transmit an optical signal on an interface 322. For example, the interface 322 can include an XFI interface, a parallel interface, or the like. The PMD Rx 320 is configured to receive an optical signal on the interface 322 and to provide the received optical signal to the G.709 decoder 314 (or the EDC 316). The PMD Rx 320 includes an optical detector which converts a received optical signal into an electrical signal which is processed by receiver circuitry including a decision circuit. The decision circuit is configured to receive and store error counts from the G.709 decoder 314. These error counts are used to adjust the receiver decision threshold in the decision circuit as described herein. The PMD Tx/Rx 318,320 can include 850 nm, 1310 nm, 1550 nm, DWDM, CWDM, and the like depending on the application requirements. Additionally, the XENPAK pluggable transceiver 300 can include a WIS encoder/decoder between the PCS 308,310 and G.709 312,314 blocks.

The XENPAK pluggable transceiver 300 is configured to interface to any host device configured to operate with pluggable transceivers compliant to the XENPAK MSA. For example, the host device can include a router, switch, optical network element, and the like. The host device can include customer premises equipment (CPE) and service provider equipment. The XENPAK pluggable transceiver 300 includes an MDIO interface 324 for communications with the host device. The XENPAK pluggable transceiver 300 is configured to utilize the communications detailed in the XENPAK MSA specification.

When the XENPAK pluggable transceiver 300 is configured in a CPE device or other remote device, the XENPAK pluggable transceiver 300 can be configured to only provide standard XENPAK MSA-based communications over the MDIO interface 324 to the host device. Accordingly, the host device is unaware of the additional framing, FEC, OAM&P functionality, dynamic receiver decision threshold adjustment, and the like. This enables any XENPAK-compliant host device to utilize the XENPAK pluggable transceiver 300 for improved optical performance. Here, the OAM&P is can be provided to a host device at a far end, such as described herein with a closed loop communication channel.

When the XENPAK pluggable transceiver 300 is configured in a service provider device or the like, the XENPAK pluggable transceiver 300 is configured to provide standard XENPAK MSA-based communications and G.709 OAM&P information over the MDIO interface 324. Here, the host device can be configured to utilize the MDIO interface 324 for G.709 OAM&P management of the XENPAK pluggable transceiver 300 in the host device and for remote far-end management of another XENPAK pluggable transceiver 300 over the closed loop communication channel. The MDIO interface 324 is configured for access to OTN alarms, PMs, and overhead. The present invention also contemplates similar operation with other MSA-compliant pluggable transceivers, such as X2, SFP+, and the like.

Figure 11:
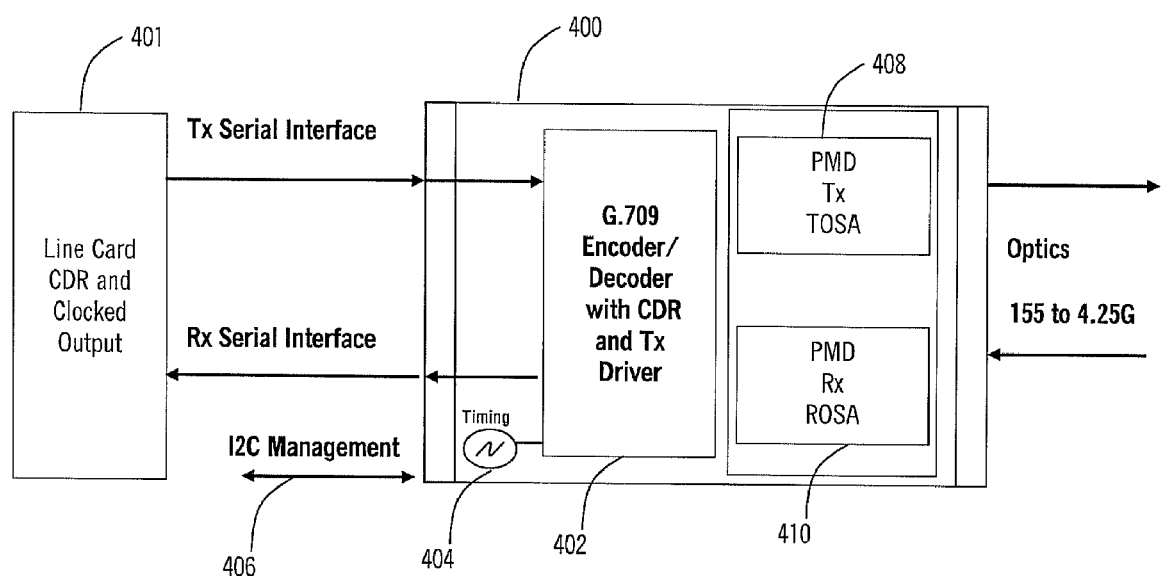
FIG. 11 is a diagram of a SFP pluggable transceiver with integrated framing, FEC, and OAM&P functionality to provide receiver threshold adjustment according to an exemplary embodiment of the present invention.

Referring to FIG. 11, a SFP transceiver 400 is illustrated with integrated framing, FEC, and OAM&P functionality to provide receiver threshold adjustment according to an exemplary embodiment of the present invention. The SFP transceiver 400 is configured to provide G.709 framing, FEC, and OAM&P functionality within the SFP transceiver 400 while preserving all of the SFP MSA specifications. The SFP transceiver 400 is configured to interface to a line card 401 or any other device configured according to the SFP MSA.

The SFP transceiver 400 includes a G.709 encoder/decoder 402, integrated timing 404, and an advanced I2C management interface 406. The SFP transceiver 400 can include a PMD Tx TOSA 408 and PMD Tx ROSA 410 as utilized in conventional SFP modules. The PMD Rx ROSA 410 includes an optical detector which converts a received optical signal into an electrical signal which is processed by receiver circuitry including a decision circuit. The decision circuit is configured to receive and store error counts from the G.709 encoder/decoder 402. These error counts are used to adjust the receiver decision threshold in the decision circuit as described herein The G.709 encoder/decoder 402 is utilized in place of a TOSA driver and Rx pre-amp, and includes the same Tx driver and Rx pre-amp functionality. The G.709 encoder/decoder 402 also includes an integrated CDR, and connects to the integrated timing 404 for synchronization. The G.709 encoder/decoder 402 can be configured to dynamically adjust a receiver decision threshold associated with the PMD TX ROSA 410.

The G.709 encoder/decoder 402 is configured to frame/unframe a signal from/to the line card 401. The framing utilizes G.709 to provide OAM&P and FEC integrated within the SFP transceiver 400. The SFP transceiver 400 is configured to frame any input signal from the line card 401 within SFP specifications, i.e. 155 Mb/s to 4.25 Gb/s. This can be done utilizing non-standard OTN rates.

The I2C management interface 406 can communicate standard MSA defined information to the line card 401 as well as OAM&P information. For example, the line card can be configured to read unused registers on the SFP transceiver 400 through the I2C management interface 406 to interface to the overhead information. Alternatively, the line card 401 does not have to interface with the overhead information as is the case in the demarcation application where the SFP transceiver 400 is installed in a CPE device, and utilizes the closed loop communication channel to report OAM&P information to the far end.

The XFP pluggable transceiver 200, XENPAK pluggable transceiver 300, and the SFP transceiver 400 are illustrated as exemplary embodiments. Those of ordinary skill in the art will recognize other pluggable transceivers and optical receivers can also utilize the receiver decision threshold described herein. With regard to pluggable transceivers, the receiver decision threshold is fully integrated within the transceiver based on the addition of integrated framing and error correction circuitry. Accordingly, the pluggable transceiver can be utilized in any MSA compliant host device without requiring modification of the host device. Advantageously, this provides optimization of receiver performance without requiring engineering modifications to existing devices compliant to the MSA specifications.

In each of the XFP pluggable transceiver 200, XENPAK pluggable transceiver 300, the SFP transceiver 400, and the like, the calculation of the receiver decision threshold can be done, for example, in a microprocessor and the value of the threshold can be applied to data recovery circuitry via a digital to analog converter (DAC). The microprocessor can be integrated to one of the circuits on the transceiver, or in a separate unit.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An optical receiver with decision threshold optimization, comprising:
    an optical detector configured to receive an optical signal and convert the optical signal to an electrical signal;
    decision circuitry configured to receive the electrical signal and to detect information from the electrical signal responsive to a decision threshold;
    integrated framing and error correction circuitry configured to deframe the optical signal and decode error correction on the optical signal;
    wherein the decision threshold comprises a default setting, and wherein the decision threshold is adjusted through a coarse adjustment mechanism, a fine adjustment mechanism in both a positive and a negative direction, and a combination thereof to minimize errors, and wherein the fine adjustment mechanism comprises:

from a current setting of the receiver threshold, selecting a positive setting and a negative setting, wherein the positive setting comprises a predetermined positive adjustment of the decision threshold from the current setting, and wherein the negative setting a predetermined negative adjustment of the decision threshold from the current setting;

setting the decision threshold at each of the positive setting and the negative setting for a predetermined time period;

measuring error count at each of the positive setting and the negative setting; and selecting one of the positive setting, the negative setting, and the current setting responsive to a lowest error count.

2. The optical receiver with decision threshold optimization of claim 1, wherein the coarse adjustment mechanism is performed if no frame and error correction count is received and the fine adjustment mechanism is performed if a valid frame and error correction count is received.

3. The optical receiver with decision threshold optimization of claim 1, wherein the coarse adjustment mechanism comprises:

for each of a plurality of sequential steps across an eye opening of the decision threshold, setting the decision threshold at one of the plurality of sequential steps and measuring an error count at the one of the plurality of sequential steps; and selecting a step of the plurality of sequential steps which comprises a lowest error count.

4. The optical receiver with decision threshold optimization of claim 1, wherein the fine sweep adjustment is repeated until a lowest error count is found.

5. The optical receiver with decision threshold optimization of claim 1, wherein the fine adjustment mechanism is performed responsive to an error count above a predetermined threshold.

6. The optical receiver with decision threshold optimization of claim 1, wherein the optical receiver comprises a pluggable optical transceiver defined by a multi-source agreement, and a host device compliant to the multi-source agreement can operate the optical receiver without modification.

7. An optical receiver with decision threshold optimization, comprising:

an optical detector configured to receive an optical signal and convert the optical signal to an electrical signal;

decision circuitry configured to receive the electrical signal and to detect information from the electrical signal responsive to a decision threshold;

integrated framing and error correction circuitry configured to deframe the optical signal and decode error correction on the optical signal; and circuitry implementing a finite state machine for setting the decision threshold wherein the finite state machine comprises a plurality states with a plurality of variables determinative of which of the plurality of states the finite state machine is in and a plurality of adjustment factors determinative of actions in each of the plurality of states, wherein the plurality of variables comprise a total number of errors collected in a predetermined interval and a threshold of total corrected errors, and wherein the plurality of adjustment factors comprise at least one tuning action and at least one searching action.

8. The optical receiver with decision threshold optimization of claim 7, wherein the finite state machine is configured to implement a fine adjustment and a coarse adjustment of the decision threshold.

9. The optical receiver with decision threshold optimization of claim 8, wherein the coarse adjustment is across an eye opening of the optical detector; and wherein the fine adjustment is in both a positive and a negative direction.

10. An optical receiver method with decision threshold optimization, comprising:

in an optical receiver, operating a finite state machine comprising a plurality states with a plurality of variables determinative of which of the plurality of states the finite state machine is in and a plurality of adjustment factors determinative of actions in each of the plurality of states, wherein the plurality of variables comprise a total number of errors collected in a predetermined interval and a threshold of total corrected errors, and wherein the plurality of adjustment factors comprise at least one tuning action and at least one searching action;

entering an initialization state;

if corrected errors are less than a corrected error threshold, entering a tuned state and performing a first fine tuning action;

if the corrected errors are greater than a corrected error threshold, entering a tuning state and performing a second fine tuning action that tunes more than the first fine tuning action;

if the optical receiver fails to correct errors due to a loss of frame, loss of signal, or block error, entering a searching state which performs a coarse searching action; and once the corrected errors are less than the corrected error threshold, entering the tuned state and operating in the tuned state until the corrected errors are above the corrected error threshold or the optical receiver fails to correct errors.

11. The optical receiver method of claim 10, wherein the optical receiver comprises a pluggable optical transceiver defined by a multi-source agreement, and a host device compliant to the multi-source agreement can operate the optical receiver without modification.

12. The optical receiver with decision threshold optimization of claim 7, wherein the optical receiver comprises a pluggable optical transceiver defined by a multi-source agreement, and a host device compliant to the multi-source agreement can operate the optical receiver without modification.

* * * * *